(12) United States Patent
Dussault

(10) Patent No.: US 10,836,651 B2
(45) Date of Patent: Nov. 17, 2020

(54) HIGH EFFICIENCY IMPROVED WATER DISTILLATION UNIT AND METHODS OF OPERATION

(71) Applicant: Winter Hill Technologies, LLC, Braintree, MA (US)

(72) Inventor: David Dussault, Stoneham, MA (US)

(73) Assignee: Winter Hill Technologies, LLC, Braintree, MA (US)

( * ) Notice: Subject to any disclaimer, the term of this patent is extended or adjusted under 35 U.S.C. 154(b) by 0 days.

(21) Appl. No.: 16/841,836

(22) Filed: Apr. 7, 2020

(65) Prior Publication Data

US 2020/0231467 A1  Jul. 23, 2020

Related U.S. Application Data

(63) Continuation of application No. PCT/US2018/055469, filed on Oct. 11, 2018.

(60) Provisional application No. 62/570,779, filed on Oct. 11, 2017.

(51) Int. Cl.
| | | |
|---|---|---|
| *C02F 1/04* | (2006.01) | |
| *B01D 1/28* | (2006.01) | |
| *B01D 3/00* | (2006.01) | |

(52) U.S. Cl.
CPC .......... *C02F 1/041* (2013.01); *B01D 1/2843* (2013.01); *B01D 3/007* (2013.01); *C02F 1/043* (2013.01); *C02F 2303/10* (2013.01)

(58) Field of Classification Search
CPC .... C02F 1/041; C02F 2303/10; B01D 1/2843; B01D 3/007
See application file for complete search history.

(56) References Cited

U.S. PATENT DOCUMENTS

| | | |
|---|---|---|
| 5,227,027 A | 7/1993 | Topper |
| 5,441,606 A | 8/1995 | Schlesinger et al. |
| 2005/0172808 A1 | 8/2005 | Yi |
| 2010/0314238 A1* | 12/2010 | Frolov .................... B01D 1/14 203/10 |

(Continued)

OTHER PUBLICATIONS

International Search Report and Written Opinion, dated Dec. 21, 2018 for International Patent Application No. PCT/US2018/055469.

(Continued)

*Primary Examiner* — Brian A McCaig
(74) *Attorney, Agent, or Firm* — Pierce Atwood LLP

(57) ABSTRACT

A water distiller provides distilled water from an input water supply for domestic, clinic, studio, hospital or factory applications with greatly improved energy efficiency. Stages of the distiller may employ under pressure conditions and/or various vapor compression, heat pump or intermediate process arrangements to provide efficient heat transfer and heating, without requiring boiling of the full input water volume. Enhanced mixing and/or heat transfer may be effected by passing water vapor through the water heating pool and result in clean, efficient distillation in a unit designed for a defined rate or volume of distillate or small system. Embodiments of the invention require less energy than required for comparably-sized direct boiling systems, and may be configured to purge gases or impurities to attain, or maintain, clean heat transfer surfaces and a desired level of product purity.

18 Claims, 8 Drawing Sheets

Vapor compression distillation process

(56) References Cited

U.S. PATENT DOCUMENTS

2016/0339356 A1* 11/2016 Govindan ............. B01D 5/003
2017/0349451 A1* 12/2017 Lockwood ............. C02F 1/048

OTHER PUBLICATIONS

Dvorak et al. "Drinking Water Treatment: Distillation" Dec. 2013; p. 2 para(0002]-[0003]; Retrieved from http://extensionpublications.unl.edu/assets/html/g1493/build/g1493.htm on Dec. 5, 2018 (Dec. 5, 2018).

Navaladian et al. "On the possible treatment procedures for organic contaminants" May 22, 2014 (May 22, 2014); p. 13 para(0004]; Retrieved from https://www.researchgate.net/publication/228779980_On_the_possible_treatment_procedures_for_organic_contaminants On Dec. 5, 2018 (Dec. 5, 2018).

Sweigart "Megahome Water Distiller Review: One of the Best" Nov. 17, 2016 (Nov. 17, 2016) Title, p. 1 para [0002]; p. 7 para[0009]; Retrieved from https://thesafehealthyhome.com/megahome-countertop-home-water-distiller/ On Dec. 5, 2018 (Dec. 5, 2018).

* cited by examiner

Vapor compression distillation process

Heat pump distillation process

Refrigerant T-s diagram

Refrigerant saturation curves

Performance plots

ECHX configurations

Concept flow diagram

Energy vs. flowrate ratio

Heat Transfer coefficient vs. Velocity

Preheat venting

Refrigerant saturation curves

Detailed layout sketch

Temperature vs. entropy diagram

Results with variable evaporator pressure

HIGH EFFICIENCY IMPROVED WATER DISTILLATION UNIT AND METHODS OF OPERATION

CROSS-REFERENCE TO RELATED APPLICATIONS

This application is a continuation of and claims the benefit under 35 U.S.C. § 120 and 35 U.S.C. § 365(c) to International Application PCT/US2018/055469, entitled HIGH-EFFICIENCY IMPROVED WATER DISTILLATION UNIT AND METHODS OF OPERATION, with an international filing date of Oct. 11, 2018, which claims priority to U.S. Provisional Application Ser. No. 62/570,779, filed Oct. 11, 2017, the entire contents of each of which are incorporated herein by reference for all purposes.

BACKGROUND AND TECHNICAL FIELD

The present invention relates to water distillation systems, methods and apparatus.

Clean water is fundamental to human life, and applications for a water purification apparatus are numerous. In the developed world, water engineers may broadly categorize treatment devices as point of entry, point of use, and point of exit for residential uses (like a house), commercial establishments (like a hotel), and industrial premises (such as a factory). The processes for purifying water, as well as the general composition and quantities of ionic, biological and other impurities present in the input water can vary tremendously, and the processes involved in engineering a major treatment plant to supply treated water having a desired purity may sometimes be performed by fitting water-related processes into the heat residue of a correlated industrial process, such as distillation by integration with an intermediate heat exchange system of a high pressure steam operated power plant. In such a situation the industrial process may involve large amounts of heat energy. However, often it is desired to produce relatively small quantities of distilled water for domestic use, or use in a small laboratory or industrial setting. In such settings, commercially available systems may rely primarily upon distillation by boiling, and a typical level of energy consumption is dictated by the requirement to raise the water temperature above 100° C.

Water purification technology falls into several broad categories—filtration and distillation. Filtration includes sand or charcoal beds, microfiltration, ultra-filtration, electrofiltration, and reverse osmosis membranes or media. Distillation includes vapor compression distillation, multiple effect thermal boiling, and direct thermal boiling. Distillation is considered the gold standard of purification because it has fundamental separation advantages over filtration, which may be seen in the web-page literature of the various commercial actors (such as H2olabs) mentioned herein. The distillation process is conceptually very simple, boiling the dirty water and condensing the clean steam in spatially separated places, just as the earth does with rain.

Water distillers can be categorized into three sizes—small, medium, and large. A small unit would be the size of a microwave or a coffee maker, be located on a kitchen counter or in a lab, and produce drinking water at a rate suitable for domestic needs—perhaps 0.5 gal/hr (gph). A medium unit would be the size of a water heater, be located in a basement, shop or utility room, and produce all water requirements for a house or building at around 20 gph. A large unit would be the size of an industrial skid, be located in an industrial facility, and produce water for a block of houses or a hotel at 1000 gph.

A direct approach of heating water to its boiling point may, however, require relatively large amounts of energy, on the order of 3 kW hr/gallon of distilled water output. However, certain efficiencies may be realized when arranging elements of a system utilizing various vaporization, condenser and heat exchange components. Enhanced energy efficiency can result in minimizing risk, capital needs and development time for the manufacture of a smaller device, by leveraging existing device technologies. Variations may offer a sizeable competitive advantage over crude distillation devices of the existing competition.

Surveying the small distiller market in the developed world, one sees several countertop distillers including those with the trade names or marks Megahome; Durastill; AquaNui; and Steam Pure, —all of which have web sites under their name displaying and describing their systems. Additionally, several resellers with water industry focus, include H2oLabs; Fresh Water Systems; Water Wise; Pure Water; Water Distillers Direct; and Steam Direct. In addition there are, in the USA, also a number of general resellers, including Amazon and Sears. The retail price point for a distiller unit varies from $200-$2000, depending on flow-rate, size, features, and materials.

By way of example, a cross section of market specs for the devices of one company, H2oLabs are shown in Table 1.

TABLE 1

H2oLabs distillers

| Model ( ) | Price ($) | Volume (gal) | Time (hr) | Flow (gph) | Power (W) | Energy (W*hr/gal) |
|---|---|---|---|---|---|---|
| 200 | 180 | 1.0 | 5.0 | 0.20 | 600 | 3000 |
| 100 | 200 | 4.0 | 24.0 | 0.17 | 580 | 3480 |
| 100SS | 220 | 4.0 | 24.0 | 0.17 | 580 | 3480 |
| 300 | 230 | 4.0 | 24.0 | 0.17 | 580 | 3480 |
| 300SS | 250 | 4.0 | 24.0 | 0.17 | 580 | 3480 |
| SteamPure | 490 | 0.9 | 5.0 | 0.18 | 700 | 3889 |
| Minni-Classic CT | 600 | 0.8 | 3.5 | 0.23 | 800 | 3500 |
| 8 GPD Manual | 700 | 8.0 | 24.0 | 0.33 | 1000 | 3000 |
| 12 GPD Manual | 800 | 12.0 | 24.0 | 0.50 | 1500 | 3000 |
| 8 GPD 2 | 960 | 8.0 | 24.0 | 0.33 | 1000 | 3000 |
| 8 GPD Auto | 900 | 8.0 | 24.0 | 0.33 | 1000 | 3000 |
| 12 GPD Auto | 1,000 | 12.0 | 24.0 | 0.50 | 1500 | 3000 |
| 700 | 750 | 5.0 | 24.0 | 0.21 | 725 | 3480 |
| 1000 | 900 | 7.0 | 24.0 | 0.29 | 850 | 2914 |
| 8 GPD Auto | 1,220 | 8.0 | 24.0 | 0.33 | 1000 | 3000 |
| 12 GPD Auto | 1,320 | 12.0 | 24.0 | 0.50 | 1500 | 3000 |

The flowrate range is roughly 0.2-0.5 gph, and the energy consumption is roughly 3000-3500 W*hr/gal. Thermodynamically, heating water from room temperature and boiling consumes roughly 3000 W*hr/gal, so one may deduce from Table 1 of device characteristics, that the current countertop distillers on the market are based on direct boiling, with no appreciable heat recovery.

Larger skid size distillers currently on the market include those of Meco and Encon. They use vapor compression distillation. This method has a thermodynamic advantage where the power input is via the steam compressor. Energy consumption is only about 100 W*hr/gal. For these units, 90-95% of the heat to the water is supplied via heat recovery.

Over the past decade, a number of companies have developed smaller distillers, roughly 20 gph. These include Zanaqua (now closed); Aquaback; and DEKA. Thus far none have made it to commercialization. There are two primary reasons. The first reason is the inverse economies of scale. The cost (per gallon of distillate) of the compressor, pumps, electrical controls, and housing become increasingly large for smaller outputs. Moreover, to have a reasonably optimized design, a custom compressor needs to be developed, and the compressor size would probably be outside the typical scope of compressors made for other mass produced applications. The second reason is maintenance. The large systems have a combination of clean-in-place, manual cleaning, and a professional operator. These solutions would constitute a large cost for a medium system. The primary reasons are that: (1) it is small enough that clean in place additions are costly, (2) it is large enough that manual cleaning takes a skilled technician several hours.

If a countertop distiller of roughly 1 gph capacity, were to be developed that uses the vapor compression process, then the operating cost could be reduced by a factor of 10, which would give a fundamental competitive advantage over the competition. The problem is how to overcome the inverse economies of scale, which are even more difficult at 1 gph than they are at 20 gph.

Given the size of the competitive landscape, it is safe to say the countertop distiller market as-is is large enough to support several companies. Indirect competition includes bottled water, the Brita pitcher [18], the PUR faucet mount [19], and several more complex inline reverse osmosis systems [20]. Clean drinking water is a mass market. If the technology proposed here disrupts the countertop distiller market, it could have the potential to capture a portion of the indirect market. More work would be required to quantify the current and expanded market in dollar terms, but the present invention is believed to clearly change the price analysis for distiller devices.

SUMMARY OF AND EXAMPLES OF EMBODIMENTS OF THE INVENTION

A water distillation apparatus efficiently produces clean water by a process of distillation in which heat or cooling are supplied, in part, from a condenser or evaporator of a refrigerant system, and/or distillation is enhanced by operating at reduced pressure allowing vaporization and condensation to occur with low energy consumption and vapor compression to provide heat back to the vaporization process. Other aspects or improvements in the distillation process include bubbling heated gas through a reservoir to better simulate nucleate boiling, and/or to remove or scavenge impurities or volatile gases, and selecting a refrigerant to match the thermal band and entropy requirements of a vacuum-assisted distiller system.

Embodiment of the present invention include a small water distiller unit, which rather than relying upon direct boiling employs apparatus that arranges its energetic processes to achieve distillation using low power consumption. Additional general goals include achieving an operating distillation assembly of low complexity and low development and manufacturing costs in a short development time and with low risk. An exemplary embodiment employs vapor compression and heat recovery, and leverages existing products by employing readily available components or subassemblies of related appliances, such as a small air conditioner or refrigerator to simplify the initial design and fabrication, or maintenance.

It is not considered feasible to meet all the foregoing objectives by directly scaling down a large, conventionally-engineered vapor compression system. One method employed in an embodiment of the present however is to introduce an intermediate heat pump stage as described below, and arrange refrigerator-like compression unit such that a compressible heat exchange fluid supplies heat to the input water, and the resulting water vapor condenses on an element cooled by the refrigerant. Further details and variations are set forth infra, for construction and operation of this embodiment, with a discussion of variations thereof. Additional embodiments are also described for a distiller with vapor compression and evaporator mixing, and other embodiments are described for a distiller system arranged with a vacuum heat pump. The corresponding sections of this specification further support claims appended below to further characterize and define the scope of invention.

Figure 1:
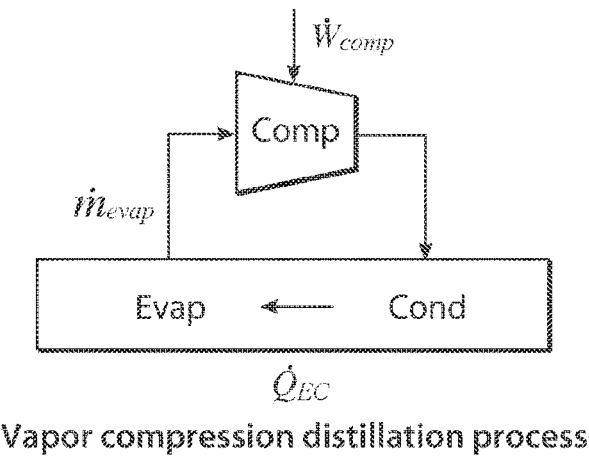
FIG. 1 schematically illustrates a basic vapor compression distillation process. The evaporator/condenser heat exchanger has a common wall. Water evaporates in the evaporator, passes through a compressor, raising the pressure and therefore saturation temperature, then condenses in the condenser. The heat of condensation supplies the heat of evaporation. The excess power required to run the compressor goes into sensible heat and venting (not shown).

Operation as a batch process for domestic or other small-volume application allows one to eliminate many features that would be required for a continuous system, such as a counterflow heat exchanger and flow controls for the incoming (influent) and exiting (distillate and concentrate) streams.

Still other device configurations and improved methods of operation are described below including technical descriptions of potential commercial product embodiments; reference is also made to the full texts and original disclosures set forth in the specification of applicant's provisional patent application filed Oct. 11, 2017, namely U.S. provisional application No. 62/570,779 entitled High Efficiency Improved Water Distillation Unit and Methods of Operation. All of the foregoing documents are hereby incorporated by reference herein in their entirety. The various commercial products and entities mentioned above may be quickly surveyed by looking at their respective internet Web sites listed as references herein, namely:

REFERENCES 1. http://www.h2olabs.com/
2. http://megahomedistiller.com/
3. http://www.durastillwatersystems.com/
4. https://myaquanui.com/
5. http://steampure.com/
6. http://www.h2olabs.com/c-2-countertop-water-distillers.aspx
7. http://www.freshwatersystems.com/c-166-water-distillers.aspx
8. http://www.waterwise.com/productcart/pc/water-distillers.asp
9. http://www.purewaterinc.com/Residential-Water-Distillers
10. http://waterdistillersdirect.com/
11. http://www.steamdistiller.com/water-distillers/
12. www.amazon.com search "countertop water distiller"
13. www.sears.com search "countertop water distiller"
14. http://www.meco.com/meco-biopharmaceutical/products/vapor-compression-stills
15. http://www.evaporator.com/mvc-evaporator
16. www.aquaback.com
17. http://www.dekaresearch.com/index.shtml
18. https://www.brita.com/
19. https://www.pur.com/
20. http://ispringwatersystems.com/
21. www.amazon.com search "Proctor Silex K2070YA"
22. https://en.wikipedia.org/wiki/List_of_refrigerants
23. hhtp://www.ebooksdshare.com/sl08060-potential-r114-replacement-refrigerants-p-395917.html This description was composed by a working engineer, and employs rather informal descriptions of the underlying instrumentation and technical physical operating characteristics, and relies also upon references to web sites, or products produced by others to augment the bare statement of physical properties or engineering concepts, as well as to indicate (to a person knowledgeable in the industry) the areas utility and a number of specific consumer products contemplated herein that may be profitably addressed with the improved distillers of the present invention. Thus, the invention contemplates small or low volume distillers which may be embodied in a counter-top appliance for domestic or laboratory use, as well as larger higher capacity skid-mounted assemblies of equipment for use in a work shop, small factory, hospital or industrial use having system supply requirements of comparable size or extent.

The invention may include a heat pump combined with the distillation apparatus. It may not be feasible to meet the objectives by directly scaling down a large vapor compression system. It is proposed instead to introduce an intermediate vapor compression step.

For reference, FIG. 1 shows the basic vapor compression distillation process. The evaporator/condenser heat exchanger has a common wall. Water evaporates in the evaporator, passes through a compressor, raising the pressure and therefore saturation temperature, then condenses in the condenser. The heat of condensation supplies the heat of evaporation. The excess power required to run the compressor goes into sensible heat and venting (not shown).

Figure 2:
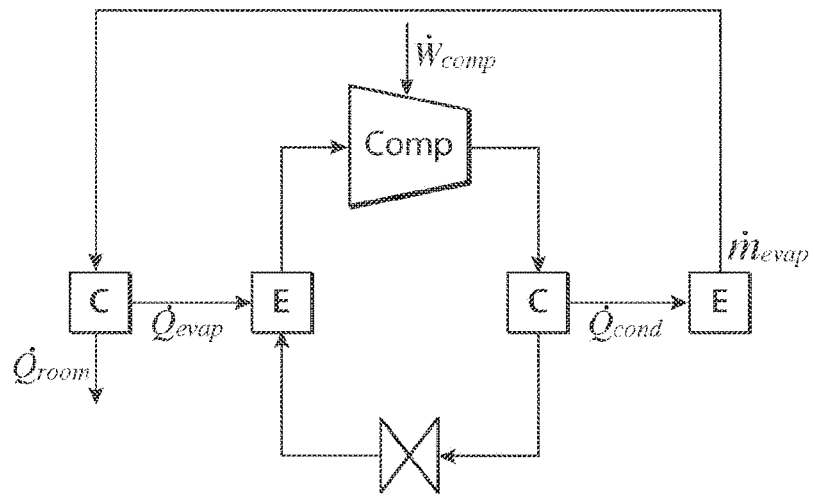
FIG. 2 is a conceptual flow diagram of this construction. The evaporator/condenser heat exchanger is separated into two separate heat exchangers, denoted by E for evaporator and C for condenser. The water evaporator and water condenser are both at atmospheric pressure. Water flows in the outer loop from the water evaporator to the water condenser. Refrigerant flows in the inner loop through a conventional refrigeration cycle, from an evaporator, to compressor, to condenser, and through a throttle valve, back to the evaporator. The compressor would include an accumulator. Heat is "pumped" from the water condenser to the water evaporator using a refrigeration cycle. The refrigerant condenser transfers heat to the water evaporator, and the refrigerant evaporator receives heat from the water condenser. Heat is rejected from the water condenser to the room to balance the compressor power.

A flow diagram of the proposed concept is shown in FIG. 2. The evaporator/condenser heat exchanger is separated into two separate heat exchangers, denoted by E for evaporator and C for condenser. The water evaporator and water condenser are both at atmospheric pressure. Water flows in the outer loop from the water evaporator to the water condenser. Refrigerant flows in the inner loop through a conventional refrigeration cycle, from an evaporator, to compressor, to condenser, to throttle valve, back to evaporator. The compressor would include an accumulator. Heat is "pumped" from the water condenser to the water evaporator using a refrigeration cycle. The refrigerant condenser transfers heat to the water evaporator, and the refrigerant evaporator receives heat from the water condenser. Heat is rejected from the water condenser to the room to balance the compressor power.

This would be a batch process, eliminating many features that might be required for a continuous system, such as a counterflow heat exchanger and flow controls for the incoming (influent) and exiting (distillate and concentrate) streams.

The following hardware is initially envisioned. The refrigeration condenser (water evaporator) may be a submerged stainless steel tube (0.25" OD), similar to an electric kettle [21] (which operates at a high temperature and has a long life). The refrigerant evaporator (water condenser) may be a stainless steel coil (0.25" OD) in the steam space, which would drip condensation to a distillate reservoir (similar to air conditioning condensation). The compressor would be a rotary refrigerant style compressor, such as one taken directly from a 5,000-10,000 BTU/hr window air conditioner, pending verification of thermal compatibility. The throttle valve would be a capillary tube (as used in an air conditioner). The heat rejected to the room would be via forced convection using a small box fan or two, similar to the cooling arrangement used for a computer. Other features would include: a heater for startup, a vent to evacuate the air, and insulation. A number of other features would likely be added as the concept gets further developed.

By using an intermediate air conditioning cycle, all the complexity, cost, time, and risk are virtually eliminated because these components have been refined over decades to be reliable, low cost, and long life. As a high level first pass, this machine would be similar in complexity to a small window air conditioner, which retail (in quantity) in the $100-$200 range. Doubling the numbers for a factor of safety, $200-$400, is still on the low end compared to existing product price numbers in Table 1.

Performance

Figure 3:
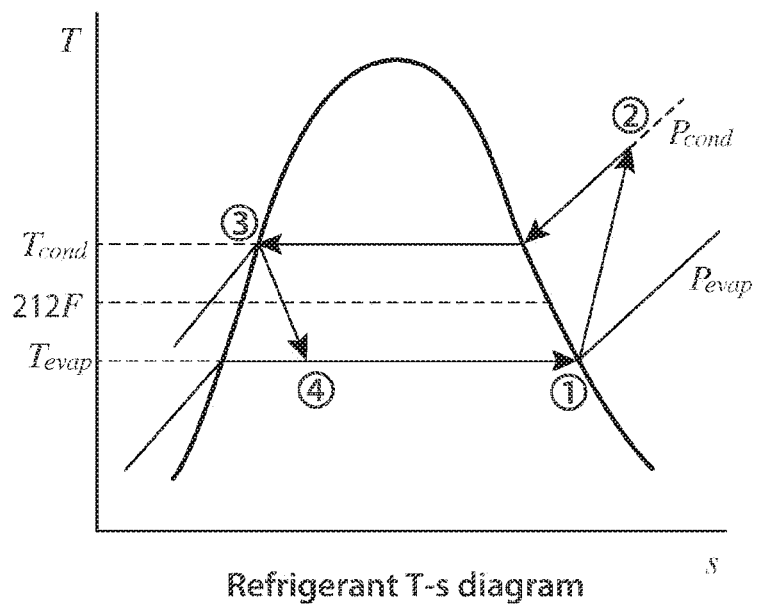
FIG. 3 shows the Temperature—Entropy (T-S) diagram for a refrigerant, indicating the energy that may be effectively applied to enhance efficiency of the vaporization and condensation processes in a distiller. The fluorocarbons constituting the refrigerant may in practice be highly regulated and be subject to changing availability, but by studying their temperature/pressure saturation curves one can select a refrigerant well fitted to the energy requirements of a small heat pump-based distiller of defined capacity and throughput.

FIG. 3 shows the thermodynamic cycle of the refrigerant on a temperature vs entropy diagram. Location 1 is the evaporator exit. Location 2 is the condenser inlet. Location 3 is the condenser exit. Location 4 is the evaporator inlet. The compressor raises the pressure from $P_{evap}$ to $P_{cond}$, and the throttle valve steps it back down. The temperature of the refrigerant condenser is above the boiling point of water. Conversely, the temperature of the refrigerant evaporator is below the boiling point of water.

The choice of refrigerant becomes critical to control the temperature. There are a multitude of options browsing the literature, R114 is well known for high temperature applications. Unfortunately it has been phased out (similar to R12). There are, however, many refrigerant options for a substitution. R21 is a reasonable substitute for illustration purposes since the data is readily available. A downside is that R21 is also being phased out. The final substitute choice will be left for a follow on action.

Figure 4:
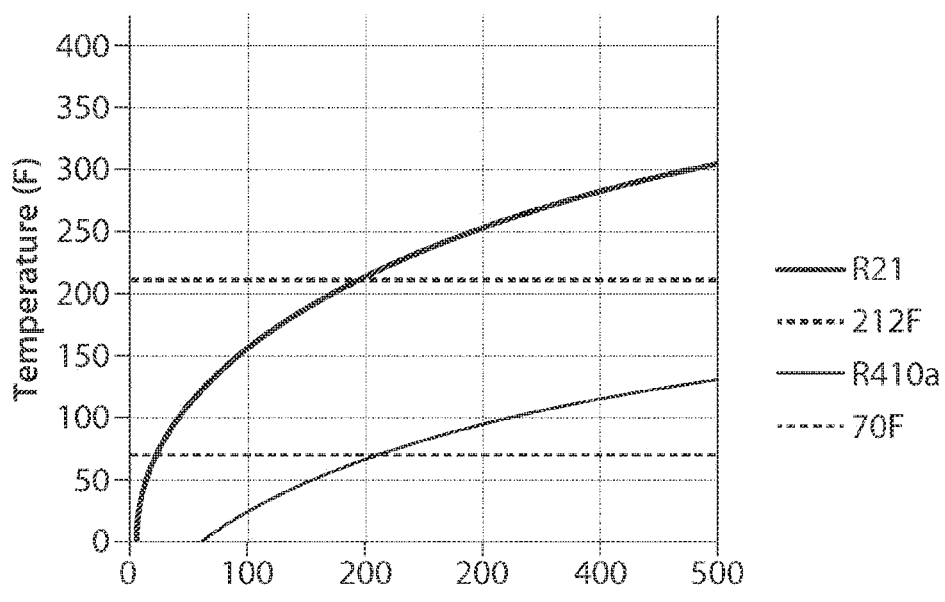
FIG. 4 plots saturation temperature against pressure for R21 and R410 refrigerants.

FIG. 4 shows the saturation temperature vs pressure curve for R21. R410a is included for reference because it is commonly used in small air conditioners. Operating pressures are roughly 100 psi on the low side and 300 psi on the high side, giving a mean pressure of 200 psi. The R410a curve shows a symmetry with respect to the 70 F reference line. The R21 curve shows a similar symmetry with respect to the 212 F reference line.

The distiller may be modelled to characterize certain components. The model formulation starts with the primary inputs: overall heat transfer coefficient in the evaporator, overall heat transfer coefficient in the condenser, compressor efficiency, compressor volume flowrate, compressor pressure rise.

inputs: $U_{evap}$, $U_{cond}$, $\eta_{comp}$, $\dot{V}_{comp}$, $\Delta P_{comp}$ The overall heat transfer coefficient accounts for the thermal resistance in the refrigerant, the wall, and the water. The compressor efficiency accounts for the compressor fluid flow and the drive motor. The compressor pressure rise was chosen to be symmetric around 200 psi, and therefore determines the evaporator and condenser pressures. The small rotary compressor envisioned here has a very steep compressor curve, so it behaves like a fixed volume flowrate.

State 1 is a saturated vapor. Let state 2s be an intermediate point as if the process from state 1 to state 2 was isentropic. The pressure at state 2s and the entropy at state 2s determine the enthalpy at 2s. The compressor power is given via efficiency $$\dot{W}_{comp} = \frac{\rho_1 \dot{V}_{comp}(h_{2s} - h_1)}{\eta_{comp}}$$

The enthalpy at state 2 is then determined from the power $$\dot{W}_{comp} = \rho_1 \dot{V}_{comp}(h_2 - h_1) \Rightarrow h_2 = h_1 + \frac{\dot{W}_{comp}}{\rho_1 \dot{V}_{comp}}$$

State 3 is a saturated liquid. The condenser heat transfer given by the states $$\dot{Q}_{cond} = \rho_1 \dot{V}_{comp}(h_2 - h_3)$$

The condenser area is determined via the overall heat transfer coefficient $$\dot{Q}_{cond} = U_{cond} A_{cond}(T_{sat,cond} - T_{water}) \Rightarrow A_{cond} = \frac{\dot{Q}_{cond}}{U_{cond}(T_{sat,cond} - T_{water})}$$

State 4 is determined by the throttling process, which conserves the enthalpy via conservation of energy $$h_4 = h_3$$

The evaporator heat transfer is given by the states $$\dot{Q}_{evap} = \rho_1 \dot{V}_{comp}(h_1 - h_4)$$

Similar to the condenser, the evaporator area is determined via the overall heat transfer coefficient $$A_{evap} = \frac{\dot{Q}_{evap}}{U_{evap}(T_{water} - T_{sat,cond})}$$

The heat rejected to the room is given by an overall energy balance $$\dot{Q}_{room} = \dot{W}_{comp}$$

The heat rejection is via convection to the room. The surface area is given by $$A_{room} = \frac{\dot{Q}_{room}}{U_{room}(T_{water} - T_{room})}$$

The following constant inputs were used:

U_evap=2000 W/m2/K
U_cond=2000 W/m2/K
U_room=50 W/m2/K
eta_comp=0.60
T_water=212 F
T_room=70 F
x_1=1.00
x_3=1.00

The heat transfer coefficients are the primary source or error. They are based on experience and should be empirically refined. The dominant thermal resistances are the refrigerant in the evaporator, the water in the condenser, and the air for the reject to the room. The evaporator has a relatively thin layer of condensation dripping off the OD, which is a small thermal resistance relative to the refrigerant flowing inside. To enhance the heat transfer, the tube ID could be decreased to increase the refrigerant velocity and internal heat transfer coefficient. The condenser is submerged and will likely be nucleate boiling, which will stir the water. The heat reject to the room is based on forced convection; i.e., from a fan. The heat transfer can be enhanced by a combination of air velocity via fan cfm and area enhancements. Note that the product of U*A is accurate here. If the heat transfer coefficients are modified during testing, then the heat transfer can be optimized via area.

The following variable inputs were used. The volume flowrate range of 0.5 to 1.0 cfm corresponds roughly to a rotary compressor of a 5,000 BTU/hr to 10,000 BTU/hr window air conditioner. The pressure rise is a sensitivity around 100 psi. The nominal pressure rise for a 5000 BTU/hr window air conditioner is 200 psi. A pressure rise of 100 psi would be controlled simply by reducing the length of the capillary tube in half.

Vdot_comp=0.5, 0.6, . . . , 1.0 cfm
dP_comp=80, 100, 120 psi

Figure 5:
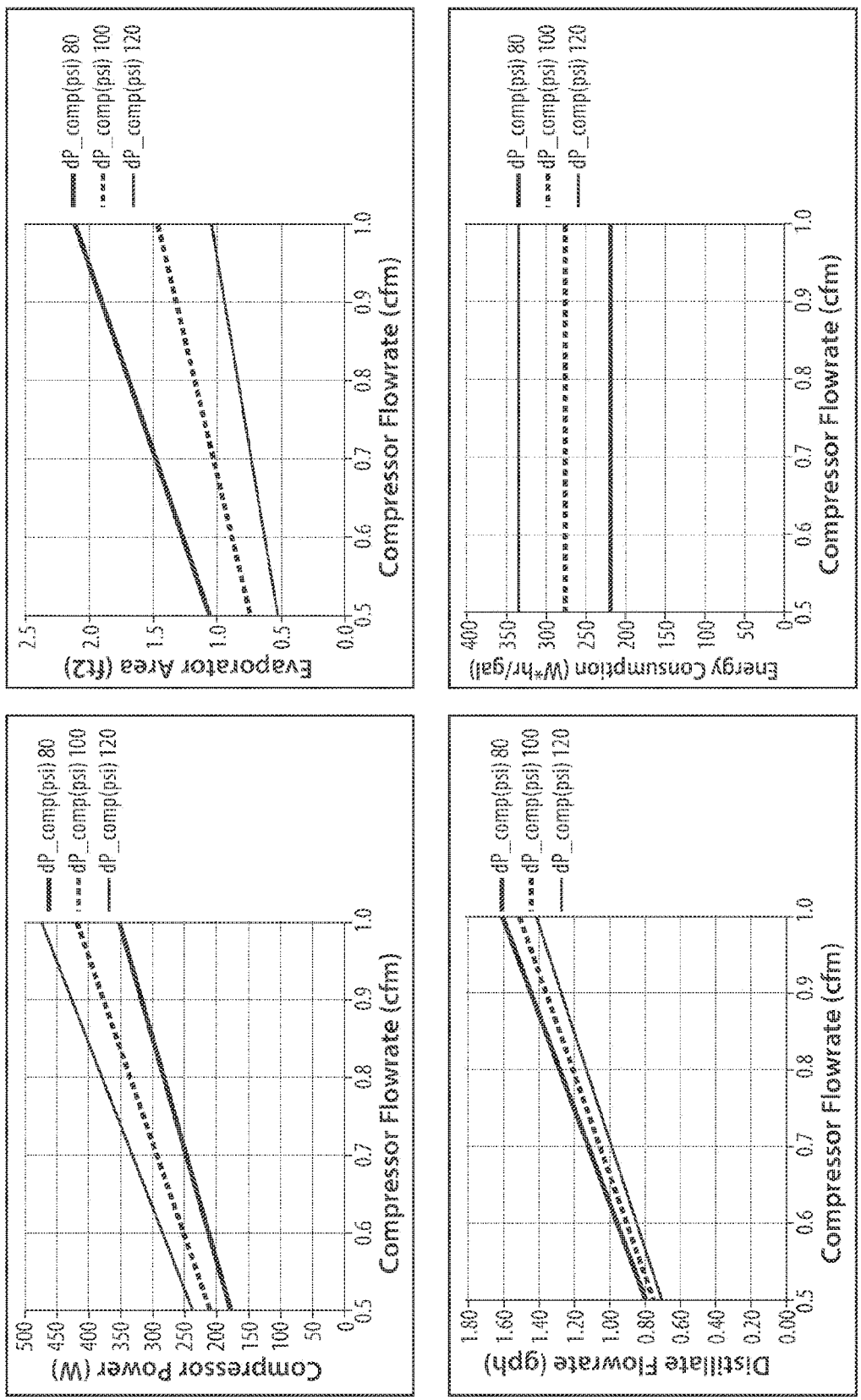
FIG. 5 illustrates a set of design curves: compressor power, evaporator area, distillate flowrate, and power consumption (W*hr/gal) vs a common x-axis of compressor flowrate.

FIG. 5 shows a set of design curves: compressor power, evaporator area, distillate flowrate, and power consumption (W*hr/gal) vs a common x-axis of compressor flowrate. A sensitivity is shown with respect to compressor pressure rise. The condenser area is not shown because it is close to that of the evaporator. The power, area, and flowrate vary linearly with flowrate. Power increases as the pressure rise increases, while the area and distillate flowrate decrease as the pressure rise increases. The power consumption varies with pressure rise only. The ultimate design point will be determined after an iterative process of design, engineering, market, and manufacturing diligence. As a first pass, 1 gph at 300 W seems a reasonable choice. This would give an advantage over the competition of roughly 2×flowrate, 1/10× energy consumption, and ½×price. That corresponds to a compressor flowrate of roughly 0.7 cfm.

Table 2 shows a detailed output table for the preliminary design point. The numbers all seem reasonable. The evaporator and condenser surface are roughly 1 ft2. This could be accomplished for instance with roughly a 15 ft length of 0.25 OD tube in a rectangular array, 8 passes on the bottom row and 7 passes on the top. The energy consumption is under 300 W*hr/gal with a factor of safety, which gives 3 cents/gal at a 10 cents/kW/hr electricity rate. The power consumption is roughly 300 W, which is low relative to breaking circuits. The heat reject to the room is also low relative to heating the room.

TABLE 2

| Output ratings | | | |
|---|---|---|---|
| U_evap(W/m2/K) | 2,000.00 | x_1 | 1.00 |
| U_cond(W/m2/K) | 2,000.00 | x_2 | 1.08 |
| U_room(W/m2/K) | 50.00 | x_3 | 0.00 |
| | | x_4 | 0.16 |
| Qdot_evap(W) | 2,223.96 | | |
| Qdot_cond(W) | 2,517.72 | A_evap(ft 2) | 1.02 |
| Qdot_room(W) | 293.77 | A_cond(ft 2) | 1.04 |
| | | A_room(ft 2) | 0.80 |
| eta_comp | 0.60 | | |
| Vdot_comp(cfm) | 0.70 | Vdot_dist(gph) | 1.06 |
| dP_comp(psi) | 100.00 | Vdot_evap(gph) | 1.06 |
| Wdot(W) | 293.77 | | |
| | | e(W*hr/gal) | 277.28 |
| P_evap(psi) | 150.00 | | |
| P_cond(psi) | 250.00 | | |
| Tsat_evap(F.) | 190.93 | | |
| Tsat_cond(F.) | 235.43 | | |
| T_water(F.) | 212.00 | | |

The patent literature on water distillation is very broad. Using the Google patent search tool, there are over 2 million patents with keywords "water" and "distillation". Adding to the list, "evaporator", "condenser", and "compressor", reduces the results to over 9000 patents. Adding "refrigerant" reduces the results to over 4000 patents. Searching through the most relevant, the following 4 patents appear to have some relevance.

(1) U.S. Pat. No. 3,312,600 entitled Heat-pump compressor type distillation apparatus for purifying water of inventor Evans T Morton issued on Apr. 4, 1967 with original AssigneeAqua Chem Inc (2) U.S. Pat. No. 4,267,022 entitled Energy efficient process and apparatus for desalinizing water of inventor Frederick L. Pitcher on May 12, 1981

(3) U.S. Pat. No. 5,227,027 entitled High efficiency water distillation apparatus using a heat pump system and process for use thereof Issued Jul. 13, 1993 to inventor Robert T. Topper; and (4) U.S. Pat. No. 5,630,913 entitled Water distillation system issued May 20, 1997 to inventor Davoud Tajer-Ardebili.

Of these publications, patent (1) uses a (refrigeration cycle) heat pump coupled with recirculating air, which allows for lower temperature psychometric evaporation. Patent (2) uses a heat pump with vacuum distillation to evaporator a low temperature. Patent (3) uses a heat pump with the water side evaporator and condenser at atmospheric pressure and therefore at high temperatures. It is a continuous flow process with all the basic components proposed here. Patent (4) uses a heat pump with vacuum distillation, with continuous flow, and some detail differentiation from patent (2). These appear to leave scope for patentable improvements, and indicate that that the most fundamental protection is over 20 years old and therefore now in the public domain. The product will have to be developed, and the coverage presumably based on a lower level of details, perhaps including its small size, energy balancing, heat reject from condenser, type of compressor, batch process, reservoir level controls or other aspects of the specific development and product. Some attributes of the target market may be inferred from the products displayed on the following web sites:

http://www.h2olabs.com/
http://megahomedistiller.com/
http://www.durastillwatersystems.com/
https://myaquanui.com/
http://steampure.com/
http://www.h2olabs.com/c-2-countertop-water-distillers.aspx
https://www.freshwatersvstems.com/c-166-water-distillers.aspx
http://www.waterwise.com/productcart/pc/water-distillers.asp
http://www.purewaterinc.com/Residential-Water-Distillers
http://waterdistillersdirect.com/
http://www.steamdistiller.com/water-distillers/
www.amazon.com search "countertop water distiller"
www.sears.com search "countertop wate rdistiller"
http://www.meco.com/meco-biopharmaceutical/products/vapor-compression-stills
http://www.evaporator.com/mvc-evaporator
www.aquaback.com
http://www.dekaresearch.com/index.shtml
https://www.brita.com/
www.amazon.com search "Proctor Silex K2070YA"
https://en.wikipedia.org/wiki/List_of_refrigerants
http://www.ebooksdshare.com/sl08060-potential-r114-replacement-refrigerants-p-95917.html
http://docs.lib.purdue.edu/cgi/viewcontent.cgi?article=1028&context=iracc
http://webbook.nist.gov/chemistry/fluid/

Systems of the invention may achieve further performance benefits by employing Vapor Compression with Evaporator Mixing. The above water distiller concept is based on a heat pump methodology. Its fundamental advantages for distillation are ideal for a small distiller, roughly 1 gph, because it offers the advantages of heat recovery while maintaining simplicity and robustness.

As larger flowrates are considered, existing distillers move to vapor compression distillation and realize the advantages of heat recovery. Here the heat pump method is at a fundamental disadvantage because it requires separate evaporator and condenser heat exchangers while the vapor compression system has a single evaporator/condenser heat exchanger.

However, a small distiller is advantageous from a business strategy point of view because it has a strong competitive advantage and has a relatively low cost and time to market. If a business successfully starts using the small distiller concept, then one option to grow would be to turn to large distillers. The objective here is to introduce a concept that offers a competitive advantage over existing large distillers.

Figure 6:
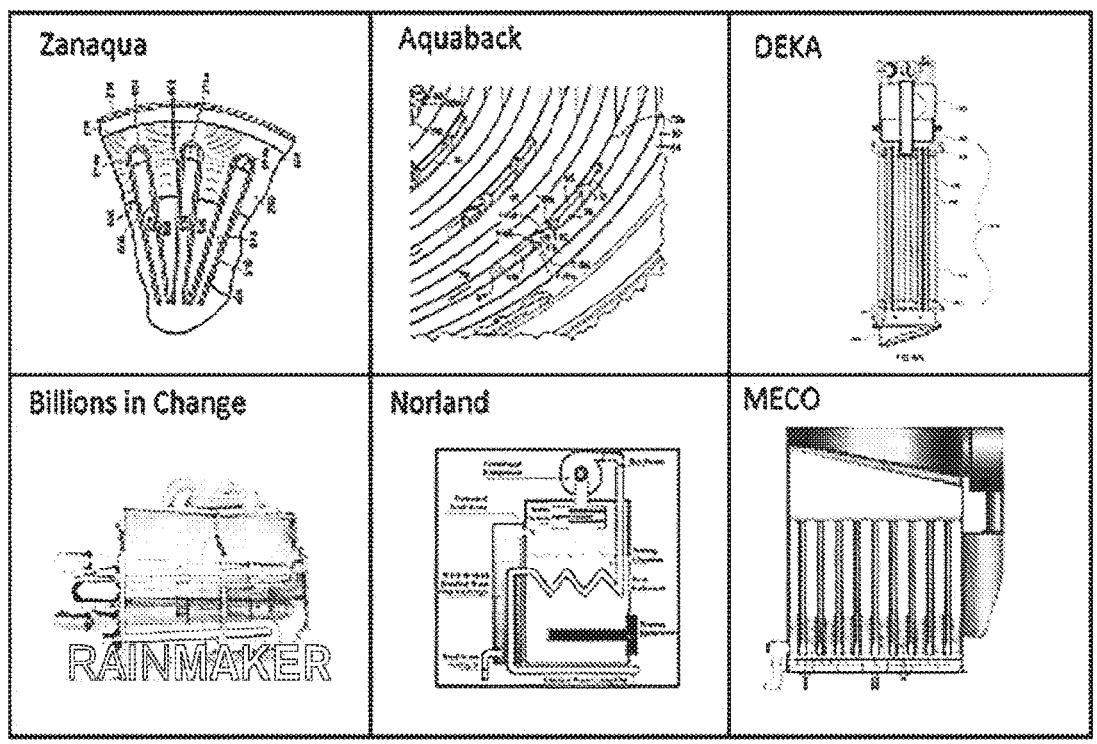
FIG. 6 illustrates evaporator/condenser heat exchanger (ECHX) portions of selected existing distillers and market technology.

FIG. 6 shows evaporator/condenser heat exchanger (ECHX) portions of selected existing distillers and market technology, spanning innovative startups to established industry standards, with a focus on the basic configuration of the evaporator/condenser heat exchanger (ECHX). Zanaqua used a rotating ECHX fabricated from sheet metal. Aquaback uses rolled and welded sheet metal, forming concentric cylinders. Various mechanisms such as a wiper are used to control a thin water film on the evaporator and condenser surfaces. DEKA uses a vertical tubes with the evaporator on the inside. Billions in Change and Norland use horizontal tubes that are submerged with the condenser on the inside and the evaporator on the outside. MECO uses vertical tubes with the evaporator on the inside.

The industry standard specification for distiller efficiency is input power in watts for 1 gallon per hour of distillate or W*hr/gal. The objective of the Zanaqua and Aquaback distillers is to achieve very low power consumption, 30 W*hr/gal and 20 W*hr/gal, respectively (comparable to reverse osmosis). The other systems are at the industry standard of roughly 100-120 W*hr/gal. Zanaqua and Aquaback achieved very low power consumption by controlling a very thin film of water on the evaporator and condenser surfaces, roughly 0.001" thick. Zanaqua controlled the film with centrifugal force. Aquaback used rotating mechanisms to control the film directly. Both methods introduce complexity that is very likely prohibitive to commercialization.

The remaining systems are more conventional, basically using a conventional shell and tube design. The minor differences introduce trade-offs. The disadvantage of DEKA and MECO having the condenser outside the tubes is that it creates a plenum, and with a plenum, control of non-water trace gases (like air) is lost. Air in the condenser reduces the distillate flowrate via a decrease in saturation temperature. The disadvantage of vertical tubes is a long condensation path and therefore a large condensation film thickness, which is a resistance to heat transfer. The disadvantages of Norland and Billions in Change submerged horizontal tubes is (1) the potential for aerosol carry-over through the compressor into the distillate and (2) a large thermal resistance on the evaporator side. They use nucleate boiling to mix the evaporator, which reduces the thermal resistance, but introduces aerosols. An aerosol separator is required for mitigation.

Zanaqua was not a commercial success and is no longer in business. Aquaback has not made a field unit in 6 years and has a doubtful future. DEKA continues to work on their distiller but commercialization has not happened and is doubtful. Zanaqua, Aquaback, DEKA, and Norland focused on mid-sized distillers, roughly 20-30 gph. Billions in Change and MECO focus on large distillers, roughly 1000 gph. The company, Billions in Change, is the process of development, but appears to be less successful than MECO. Norland and MECO are actively selling distillers and are the benchmark for existing medium and large systems, respectively.

The Norland and MECO distillers are skid-mounted or dolly-mounted consoles. The Norland distiller is intended to be simple to install, move, and operate and is similar in size to a refrigerator. The MECO distiller is industrial skid mounted and requires a skilled operator and regular maintenance, similar to (but less than) a reverse osmosis system.

Figure 7:
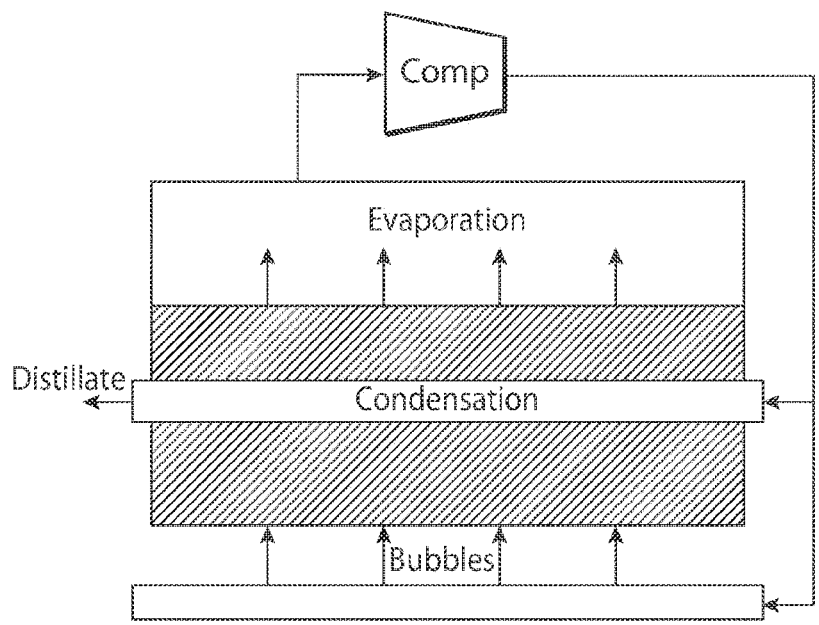
FIG. 7 illustrates a sketch of a further variation.
Figure 8:
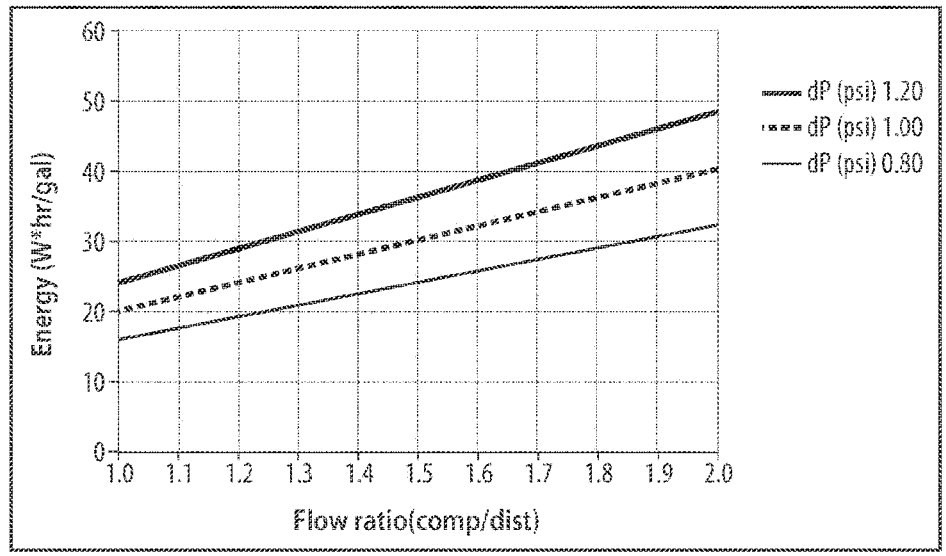
FIG. 8 illustrates the energy against flowrate ratio.

FIG. 7 shows a sketch of the concept. The shell and tube configuration is a standard heat exchanger fabrication with low risk. The condenser is on the inside to maintain gas velocities and control the trace non-water gases. The horizontal layout minimizes the condenser film thickness via a short vertical flow distance. The condenser tubes are submerged. The idea is to blead off the compressor flow and recirculate it to the evaporator, introducing bubbles to mix the evaporator. This enables a low temperature difference across the ECHX (provided by a low compressor pressure rise) which enables a low power consumption. The heat transfer is via convection from the metal/liquid interface and evaporation from the liquid/gas interface. The extra compressor flow will act to increase the power consumption, but because the compressor pressure rise is low, the net effect is a low power consumption. The evaporation mode will likely reduce the source of aerosol carry over because the bubbles can be controlled.

The ECHX is shown simply with a single tube. The detailed layout is TBD pending a mix of analytical and empirical optimization. Early very rough estimates are: 1-2" tube diameter, 1×-2× diameter tube to tube spacing, 2-3 tubes stacked vertically, recirculation flow 0.5×-1.0× the distillate.

The flow diagram above focuses on the ECHX. The remainder of the distiller is excluded to focus on the core patent idea. The development plan is to maximize standard parts and controls for remainder of the distiller.

Performance Analysis

The compressor power $\dot{W}_{comp}$ is closely approximated with an incompressible flow relation $$\dot{W}_{comp} \cong \frac{\dot{V}_{comp}\Delta P_{comp}}{\eta_{comp}}$$

where $\dot{V}_{comp}$ is the compressor volume flowrate, $\Delta P_{comp}$ is the compressor pressure rise, and $\eta_{comp}$ is the overall compressor efficiency (including motor). Using conservation of mass, taking the recirculation flow into account, the specific energy consumption (W*hr/gal) is given by $$e = \left(\frac{\dot{W}_{comp}}{\dot{V}_{dist}}\right) \cong \left(\frac{\rho_f}{\rho_g}\right)\frac{\Delta P_{comp}}{\eta_{comp}}\left(\frac{\dot{m}_{comp}}{\dot{m}_{dist}}\right)$$

where $\rho_f$ is water liquid density, $\rho_g$ is water vapor density, and $\dot{V}_{dist}$ is distillate volume flowrate. The specific energy consumption is proportional to the compressor pressure rise and the flow ratio. FIG. 4 shows the energy vs flow ratio for compressor pressure rises of 0.8 psi, 1.0 psi, and 1.2 psi. The corresponding temperature differences are 2.68 F, 3.33 F, and 3.98 F, all well below the nucleate boiling threshold of roughly 10-20 F (depending on the metal surface). A flow ratio of 1.5 to 2.0 is anticipated. At 1 psi the corresponding energy is 30 to 40 W*hr/gal.

FIG. 8 illustrates the Energy vs flowrate ratio.

The compressor pressure rise dictates the water saturation temperature in the evaporator and condenser, which is essentially linear over the small pressure differences considered here (roughly 1 psi). The heat transfer through the ECHX is given by 1D heat conduction, with conduction through the thin condenser film, conduction through the ECHX wall, and convection from the evaporator surface to the evaporator liquid $$\dot{Q}_{EC} = \frac{(T_{cond} - T_{evap})A_{EC}}{\left(\frac{\delta}{k}\right)_{cond,film} + \left(\frac{\delta}{k}\right)_{wall} + \left(\frac{1}{h}\right)_{evap}} = U_{EC}A_{EC}\Delta T_{EC}$$

where δ is thickness, k is thermal conductivity, h is convection heat transfer coefficient, and $U_{EC}$ is the overall heat transfer coefficient. Neglecting sensible heat relative to latent heat, the distillate mass flowrate $\dot{m}_{dist}$ is related to the ECHX heat transfer through the water heat of vaporization $h_{fg}$ $$\dot{m}_{Mist} = \frac{\dot{Q}_{Ec}}{h_{fg}} = \frac{U_{EC}A_{EC}\Delta T_{EC}}{h_{fg}}$$

The distillate flowrate is therefore proportional to the overall heat transfer coefficient, the EC area, and the compressor pressure rise (via the saturation temperature difference). To estimate the required ECHX area (i.e. one side), the largest uncertainty becomes the evaporator heat transfer coefficient. The Appendix shows numbers based on flow across a cylinder. Using a 1 mil condenser film, a 20 mil stainless steel wall, a 1 psi pressure difference, and an evaporator heat transfer coefficient of 5,000-10,000 W/m2/K, the required surface area for 1 gph of distillate is 3.8 to 2.4 ft2, respectively. The response is not exactly linear because of the thermal resistances of the wall and condenser film.

Next consider the comparison of opex (operating expense) and capex (capital expense). The dominant opex is energy consumption. Assuming 10 cents/kW/hr and a 10-20 year life, the total opex is $350 to $700 per gph, respectively (using constant dollar values). Based on the inventor's experience of BOM (bill of materials) cost estimates with distillers, a capex of $500-$1,000 per gph is reasonable. Using this rough comparison, the opex and capex are similar magnitudes. The design should therefore balance these two factors. Furthermore, while the patent literature on water distillers is extensive, and a search (using Google Patents) for "water" or "distiller" has 1,589,141 results, this was filtered further to include "evaporator" "condenser" "compressor" for vapor compression distillation yielding 7,590 results. The key aspect of the idea here is forced convection in the evaporator, and adding "evaporator mixing" or "evaporator bubbles" or "evaporator forced convection" to the search resulted in 0 results. By this quick preliminary search, there appeared to be no prior patents. As a sanity check, the inventor is unaware of any machines that use this method.

Further Discussion

The basic intuitive idea here is to generate the conditions of boiling without paying the energy cost for nucleate boiling. A mixer could be used instead of bubbles, and both may be investigated. Bubbles were chosen for initial product development because (1) there are no mechanisms and (2) there is a basic energy requirement to move around the evaporator liquid that can't be avoided.

The largest performance uncertainty is the evaporator heat transfer coefficient. Assuming a free stream velocity and using a cylinder in cross flow correlation resulted in roughly 2.5-4 ft2 or 3-4 ft2 (being conservative with round numbers) for 1 gph at 1.0 psi. As a sanity reference check, Zanaqua was roughly 2 ft2 for 1 gph at 0.8 psi. Deka was roughly 2 ft2 for 1 gph at roughly 4 psi, or equivalently 8 ft2 for 1 gph at 4 psi. Aquaback was roughly 1.5-2.0 ft2 for 1 gph at 0.8 psi with near perfect film control (in the lab). The concept here should require more area than Zanaqua and Aquaback and less area than DEKA, so that gives a range of 2-8 ft2 for 1 gph. Therefore 3-4 ft2 seems reasonable.

Various levels of analytical method can be used to optimize the ECHX, but ultimately test data will be required for verification. A small set of tubes can be used to generate a low flowrate, perhaps 1 gph. The results can be used to scale up the area to get larger distillate flows. For the small flow test, the test can be purely thermal. The evaporator and condenser flows can be completely independent. The condenser side can be supplied by a pressure cooker, where the pressure is measured. The evaporator side can be held at temperature using a heater, with steam vented to the atmosphere to control the pressure.

The relatively low pressure rise noted here of 1 psi is adequate for influent composition up to about 10,000 ppm. Above that the boiling point rise in the evaporator becomes more significant. Trade-offs between increased compressor pressure rise and concentrate flow come into play. This is the case for all distillers. A fundamental advantage of staying below the nucleate boiling threshold would still hold.

My personal experience is valuable for market research, but a more formal study should be performed, followed by ongoing strategy and business development. This will be used to evaluate technical trade-offs along the development path.

There are two basic levels of competition for water purification: (1) vs other distillers or (2) vs filtration. The distillation market is a subset of the filtration market. Broadly speaking, distillation is the gold standard of water purification and would be preferred to filtration if the power consumption was lower and if maintenance was low. Reasons include: (1) the process is at a high temperature and is inherently sanitary, (2) the reject flowrate is low, (3) the quality is very good, (4) the influent competition is irrelevant (with small exceptions), (5) it is inherently safe with the high pressure side on the clean side, (5) there are no (significant) consumables or replacement parts. The primary barrier to adoption is power consumption. Aquaback is trying to dominate the entire market, matching filtration on energy consumption at roughly 20 W*hr/gal, but with a trade-off of significant complexity. An intermediate energy consumption still represent an extremely high upside, potentially capturing a majority of distiller applications and part of filtration applications.

The idea focused on the ECHX. There are a number of other subsystems that are required, including the compressor, a counterflow heat exchanger, venting, flow controls, and outside insulation. In the short run, the product may use what existing distillers use. In the long run, more custom designs can be developed and optimize performance.

Claims of the water market range from hundreds of billions to trillions globally at present. Moreover, as the world population grows and with conflicts between countries as a variable, the situation could escalate. The water literature is extensive. Whatever the market numbers are, they are very big, considering the fundamental importance of clean water.

Foregoing discussion presented a vapor compression distiller that uses evaporator mixing. There are two basic approaches—a mechanical mixer or a bubbler via compressor recirculation. Bubbles are initially the preferred approach. The forced convection in the evaporator will enable heat transfer via convection rather than nucleate boiling, which allows the compressor to run a low pressure and therefore a low energy consumption (W*hr/gal). This configuration is a balance between (1) the relatively simple/robust, high energy systems currently adopted by the market and (2) the relatively complex very low energy lab units under development. These may be further improved by analytical optimization and small scale lab testing.

Heat Transfer Coefficient—Evaporator

For a relatively low temperature difference between the condenser and evaporator, the boiling mode is pre-nucleate via convection heat transfer. For horizontal condenser tubes and a vertical evaporator flow field, the heat transfer coefficient can be estimated by cross flow over a cylinder.

$$Nu_D =$$

$$\begin{cases} 0.3 + \dfrac{0.62 \mathrm{Re}_D^{\frac{1}{2}} Pr^{\frac{1}{3}}}{\left[1 + \left(\frac{0.4}{Pr}\right)^{\frac{2}{3}}\right]^{\frac{1}{4}}} & (\mathrm{Re}_D < 10^4) \\[2ex] 0.3 + \dfrac{0.62 \mathrm{Re}_D^{\frac{1}{2}} Pr^{\frac{1}{3}}}{\left[1 + \left(\frac{0.4}{Pr}\right)^{\frac{2}{3}}\right]^{\frac{1}{4}}}\left[1 + \left(\frac{\mathrm{Re}_D}{282{,}000}\right)^{\frac{1}{2}}\right] & (2 \times 10^4 < \mathrm{Re}_D < 4 \times 10^5) \\[2ex] 0.3 + \dfrac{0.62 \mathrm{Re}_D^{\frac{1}{2}} Pr^{\frac{1}{3}}}{\left[1 + \left(\frac{0.4}{Pr}\right)^{\frac{2}{3}}\right]^{\frac{1}{4}}}\left[1 + \left(\frac{\mathrm{Re}_D}{282{,}000}\right)^{\frac{5}{8}}\right]^{\frac{4}{5}} & (4 \times 10^5 < \mathrm{Re}_D < 5 \times 10^6) \end{cases}$$

Figure 9:
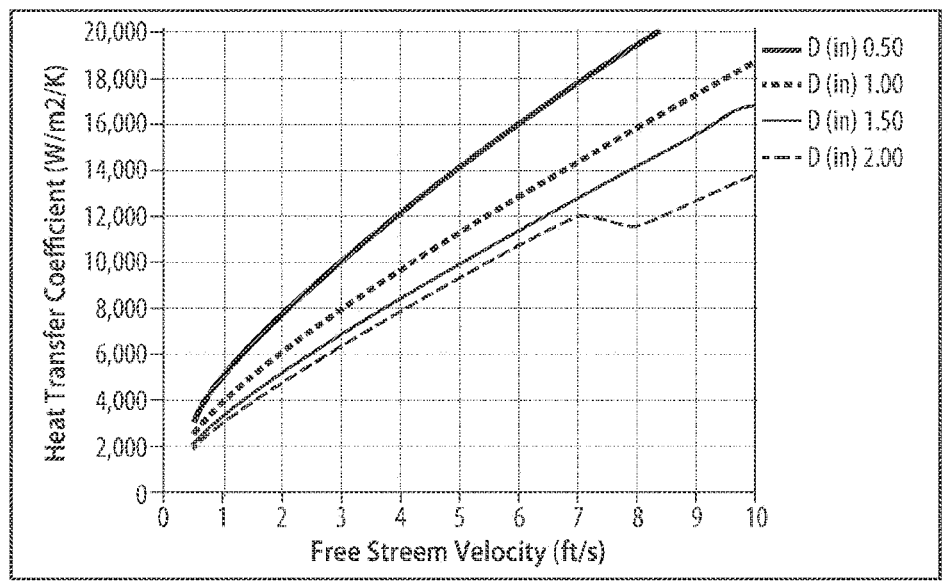
FIG. 9 illustrates heat transfer coefficient against flow velocity.

FIG. 9 shows the heat transfer coefficient as a function of free stream approach velocity with a sensitivity with respect to tube diameter.

Water Distiller Using a Vacuum Heat Pump Method

This portion discusses a variation on the heat pump concept for a small distiller, which reduces risk by operating the heat pump at lower typical temperatures. The trade-off is that the water chambers have to be perfectly sealed. Relative to existing small distillers, the flowrate is 2-4× more and the energy consumption is 4-5× less. A preliminary performance optimization was performed to determine subsystem requirements. Next steps include a market study, refined math modeling, and testing.

Several concepts or device architectures were presented supra for a new water distiller. The first architecture uses a steam compressor and mechanism-free forced convection in the evaporator. The second architecture uses a heat pump method with a refrigerant compressor. The descriptions were written as personal documents (of inventor David Dussault) and the devices are in process of development and proofing starting with a small distiller (around 1 gph) that is low in capital and time relative to a large distiller (100+ gph), which can be developed later.

One difficulty with using a steam compressor at small scale is that they are not available, and would require a major development effort. The heat pump approach solves this problem by using a readily available, nominally robust refrigerant compressor. However, in order to boil water, the compressor would be used at a higher temperature than any known application. This does not pose a fundamental problem, but does introduce an uncertainty/risk factor. These possible difficulties are addressed by a third architecture, introduced here, that uses a heat pump with a refrigerant compressor operating at a nominal (lower) temperature. To do so the water is held at a low vapor pressure. The trade-off here becomes added complexity in startup, venting, and control of non-water gases (air and volatiles).

FIG. 4 shows the heat pump distillation concept. The outer loop contains water undergoing a batch boiling process. The inner loop contains refrigerant undergoing a continuous refrigeration cycle. Water boils in the outer evaporator. Steam travels to the outer condenser where it condenses. The heat pump provides the phase change heat transfer that condenses water on the left and evaporates water on the right. The refrigerant evaporators in the inner evaporator, passes through a compressor, condenses in the inner condenser, and then passes through a flow restriction. The outer condenser has heat rejected to the room to balance the power input to the compressor.

Figure 10:
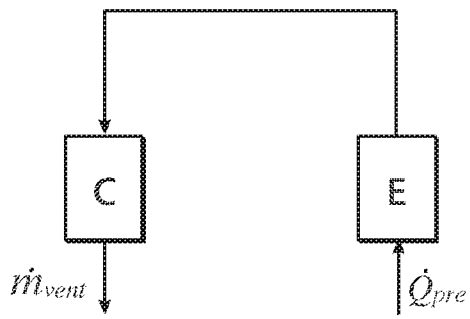
FIG. 10 illustrates a preheat venting arrangement.

In this method the refrigerant operates at a nominal temperature by boiling water at a sub-atmospheric pressure. The low pressure is accomplished by preheat venting shown in FIG. 10. A heater is used to preheat the evaporator, at atmospheric pressure, to boil water at 212 F. The condenser contains a relief valve that cracks and purges the system of ideally all non-water species, including the initial air space, air dissolved in the water, and volatiles. The purging process is similar to that of a siphon/vacuum coffee maker.

The initial atmospheric hot boiling is preferred for sanitation purposes in addition to driving off volatiles.

Figure 11:
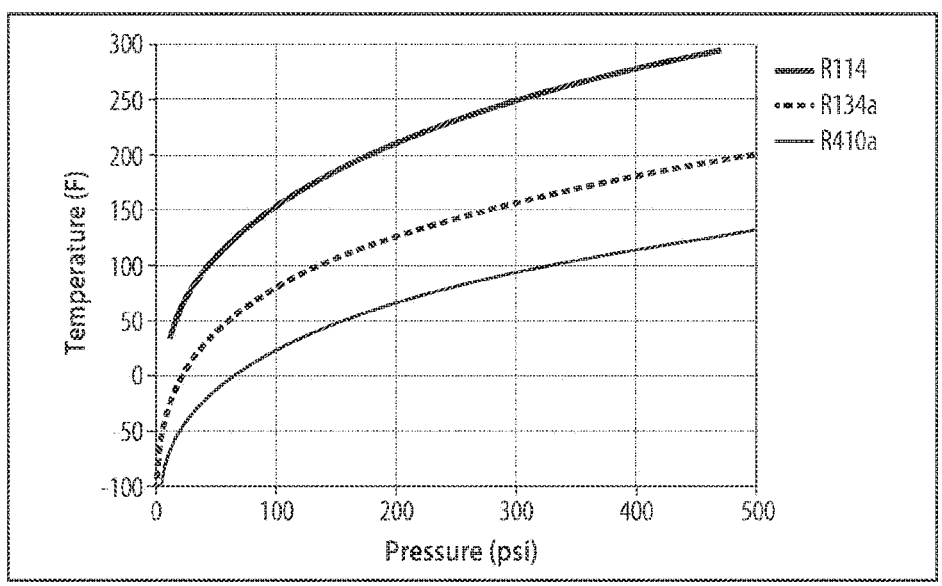
FIG. 11 illustrates the temperature vs pressure saturation curves for three reference refrigerants.

FIG. 11 shows the temperature vs pressure saturation curves for three reference refrigerants. R114 was used in a prior simulation as a hot boiling option because the low and high side temperatures are around 150 and 250 F. R410a is used in air conditioners, with low and high side temperatures 30 and 100 F. R134a is used in residential refrigerator/freezer applications with low and high temperatures around 0 and 90 F. R134a is also recently used in higher temperature water heater applications with low and high temperatures around 32 and 160 F, indicating suitable characteristic for a heat pump at the lower vapor pressures contemplated here.

To reduce risk and be consistent with existing systems, R134a is selected with a high side pressure of 300 psi. The low side pressure can vary as a design option.

Figure 12:
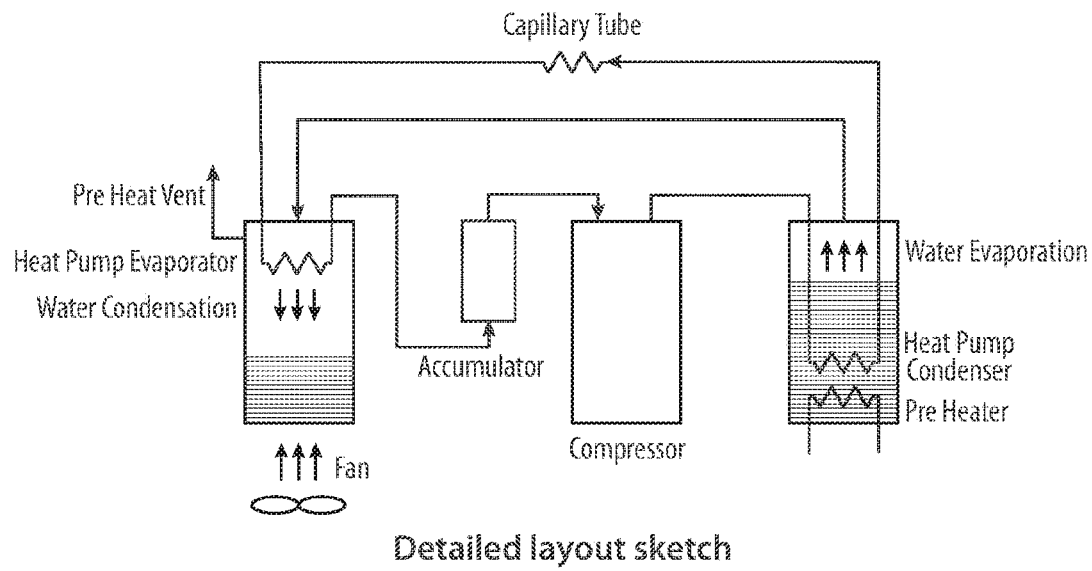
FIG. 12 illustrates physical layout.

Next consider a more physical layout, as sketched in FIG. 12. A heater is used to the initial heat-up and to purge the system of non-water species. The heater can be a submerged element as shown or external/under the water evaporation chamber. Air/volatiles are vented in the condenser using a one way check valve that cracks at a pressure slightly above atmospheric, around 0.5-1.0 psig. The check valve cannot leak. After the pre-heat duration, the heater is turned off and the compressor is turned on. Refrigerant evaporates from water condensation on the left, passes through an accumulator (to protect the compressor from liquid), then passes through a compressor (that draws power), raising the pressure and temperature, then condenses as it transfers heat as water evaporates via nucleate boiling, then passes through a capillary tube flow restriction reducing the pressure and temperature back to evaporator conditions, completing the cycle. The power input to the compressor is balanced and rejected to the surrounding air via forced convection on the left chamber.

Performance Model

Figure 13:
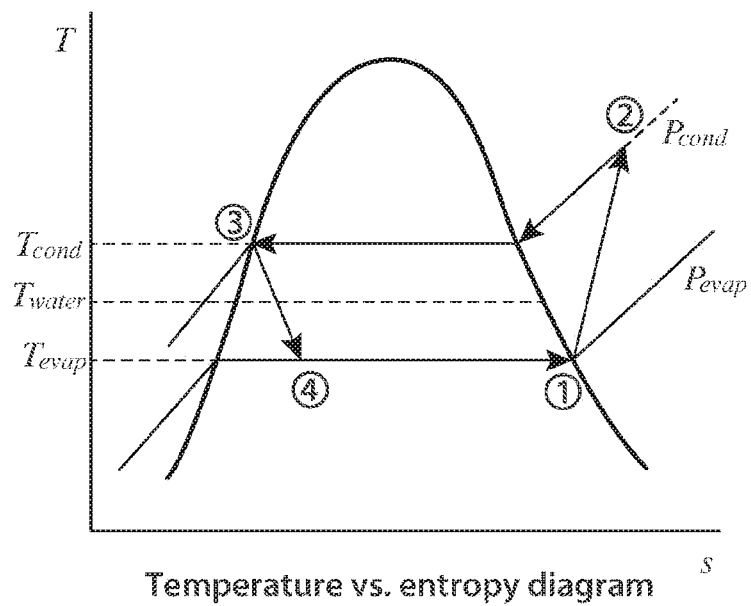
FIG. 13 is a temperature entropy diagram for lower temperature operation.

The refrigeration cycle may be viewed on a temperature vs entropy diagram, FIG. 13. The refrigerant begins as a saturated vapor in state 1. From state 1 to 2, it passes through the compressor where the pressure increases from $P_{evap}$ to $P_{cond}$ and the entropy increases due to inefficiencies. It exits as a superheated vapor in state 2. From state 2 to 3, heat is rejected in the condenser, first via sensible heat and then via latent heat. It exits as a saturated liquid in state 3. From state 3 to 4, it passes through a flow restriction (capillary tube), dropping the pressure from $P_{cond}$ back to $P_{evap}$. It exits as a saturated mixture in state 4. From state 4 to 1, heat is added in the evaporator. This completes the cycle as it leaves the evaporator as a saturated vapor in state 1.

The model here is an extension of tone architecture described above. There are two notable extensions—a variable water temperature and a constrained distillate flowrate. For brevity some of the steps detailed above are summarized here.

The model uses a 2D nonlinear (Newton) solver of the form $\vec{F}(\vec{\varphi})=0$, where $\vec{\varphi}$ is vector of unknowns and are considered quasi-givens $$\vec{\phi} = \begin{pmatrix} T_{water} \\ \dot{V}_{comp} \end{pmatrix}$$

It includes the water temperature and the compressor volume flowrate. A constant compressor volume flowrate is used in anticipation of a positive displacement compressor. Model inputs include:

$U_{evap}$ Overall heat transfer coefficient between refrigerant evaporator and water condenser $U_{cond}$ Overall heat transfer coefficient between refrigerant condenser and water evaporator $U_{room}$ Overall heat transfer coefficient between water condenser and room air $\eta_{comp}$ Overall compressor efficiency (including motor)

$T_{room}$ Room air temperature $P_{evap}$ Pressure of refrigerant evaporator $P_{cond}$ Pressure of refrigerant condenser The evaporator and condenser pressure dictate all the saturation refrigerant thermodynamic properties. The NIST online source http://webbook.nist.gov/chemistry/fluid/ was used to identify physical properties.

The state 1 saturated vapor constraint defines state 1. The compressor power is determined from the compressor efficiency and the volume flowrate $$\dot{W}_{comp} = \frac{\rho_1 \dot{V}_{comp}(h_{2s} - h_1)}{\eta_{comp}}$$

where state 2s represents isentropic compressor. The enthalpy in state 2 is follows from the compressor power $$h_2 = h_1 + \frac{\dot{W}_{comp}}{\rho_1 \dot{V}_{comp}}$$

State 3 is constrained as a saturated liquid. The condenser heat transfer is determined from the enthalpy difference $$\dot{Q}_{cond} = \rho_1 \dot{V}_{comp}(h_2 - h_3)$$

State 4 is determined by the throttling process, which conserves the enthalpy via conservation of energy $$h_4 = h_3$$

The evaporator heat transfer is given by the enthalpy difference $$\dot{Q}_{evap} = \rho_1 \dot{V}_{comp}(h_1 - h_4)$$

The distillate flowrate follows from the heat of vaporization $$\dot{m}_{dist} = \frac{\dot{Q}_{evap}}{h_{fg}}$$

The heat rejected to the room is given by an overall energy balance $$\dot{Q}_{room} = \dot{W}_{comp}$$

The heat exchanger surface areas all depend on the (quasi-given) water temperature and the respective overall heat transfer coefficients.
For the condenser $$A_{cond} = \frac{\dot{Q}_{cond}}{U_{cond}(T_{sat,cond} - T_{water})}$$

For the evaporator $$A_{evap} = \frac{\dot{Q}_{evap}}{U_{evap}(T_{water} - T_{sat,cond})}$$

For the heat rejection to the room $$A_{room} = \frac{\dot{Q}_{room}}{U_{room}(T_{water} - T_{room})}$$

The water temperature is uniform because the water space is a uniform pressure. The solver residual function contains a constraint on the areas $$F_1 = A_{evap} - A_{cond}$$

and a constraint on the distillate flowrate to a set value $$F_2 = \dot{m}_{dist} - \dot{m}_{dist,set}$$

Taking an overview of the formulation, the area constraint was used in order to add a degree of freedom for the water temperature. Any relation between the areas would constrain the system of equations. An equal area division is used as a reasonable starting point.
Results Table 1A shows the inputs common to all runs. The heat transfer coefficients are based on experience and are a source of error. The distillate flowrate was set to 1 gph (at standard conditions).

TABLE 1A

| Common inputs | |
|---|---|
| U_evap(W/m2/K) | 2,000.00 |
| U_cond(W/m2/K) | 2,000.00 |
| U_room(W/m2/K) | 100.00 |
| eta_comp | 0.60 |
| P_cond(psi) | 300.00 |
| x_1 | 1.00 |
| x_3 | 0.00 |
| Vdot_dist(gph) | 1.00 |

Table 2A shows detailed output from a single run with the evaporator pressure at 170 psi, which is a reasonable starting point for a design. The water temperature is 133 F. The refrigerant is roughly 20 F above and below the water temperature in the respective hot and cold side heat exchangers. This provides nucleate boiling on the evaporator side. The surface areas are all roughly 1 ft2. The refrigerant volume flowrate is roughly equivalent to a 6000 BTU/hr air conditioner. The power is 321 W. The water pressure is low at 2.4 psi is low and require sufficient sealing.

TABLE 2A

| | | | |
|---|---|---|---|
| U_evap(W/m2/K) | 2,000.00 | Tsat_evap(F.) | 113.73 |
| U_cond(W/m2/K) | 2,000.00 | Tsat_cond(F.) | 156.15 |
| U_room(W/m2/K) | 100.00 | T_water(F.) | 133.40 |
| x_1 | 1.00 | P_evap(psi) | 170.00 |
| x_2 | 1.09 | P_cond(psi) | 300.00 |
| x_3 | 0.00 | P_water(psi) | 2.44 |
| x_4 | 0.24 | | |
| | | A_evap(ft 2) | 1.01 |
| eta_comp | 0.60 | A_cond(ft 2) | 1.01 |
| Vdot_comp(cfm) | 0.63 | A_room(ft 2) | 0.98 |
| dP_comp(psi) | 130.00 | Vdot_dist(gph) | 1.00 |
| Qdot_evap(W) | 2,055.42 | Vdot_evap(gph) | 1.00 |
| Qdot_cond(W) | 2,376.41 | | |
| Qdot_room(W) | 321.00 | e(W*hr/gal) | 321.00 |
| Wdot(W) | 321.00 | COP | 6.40 |

Figure 14:
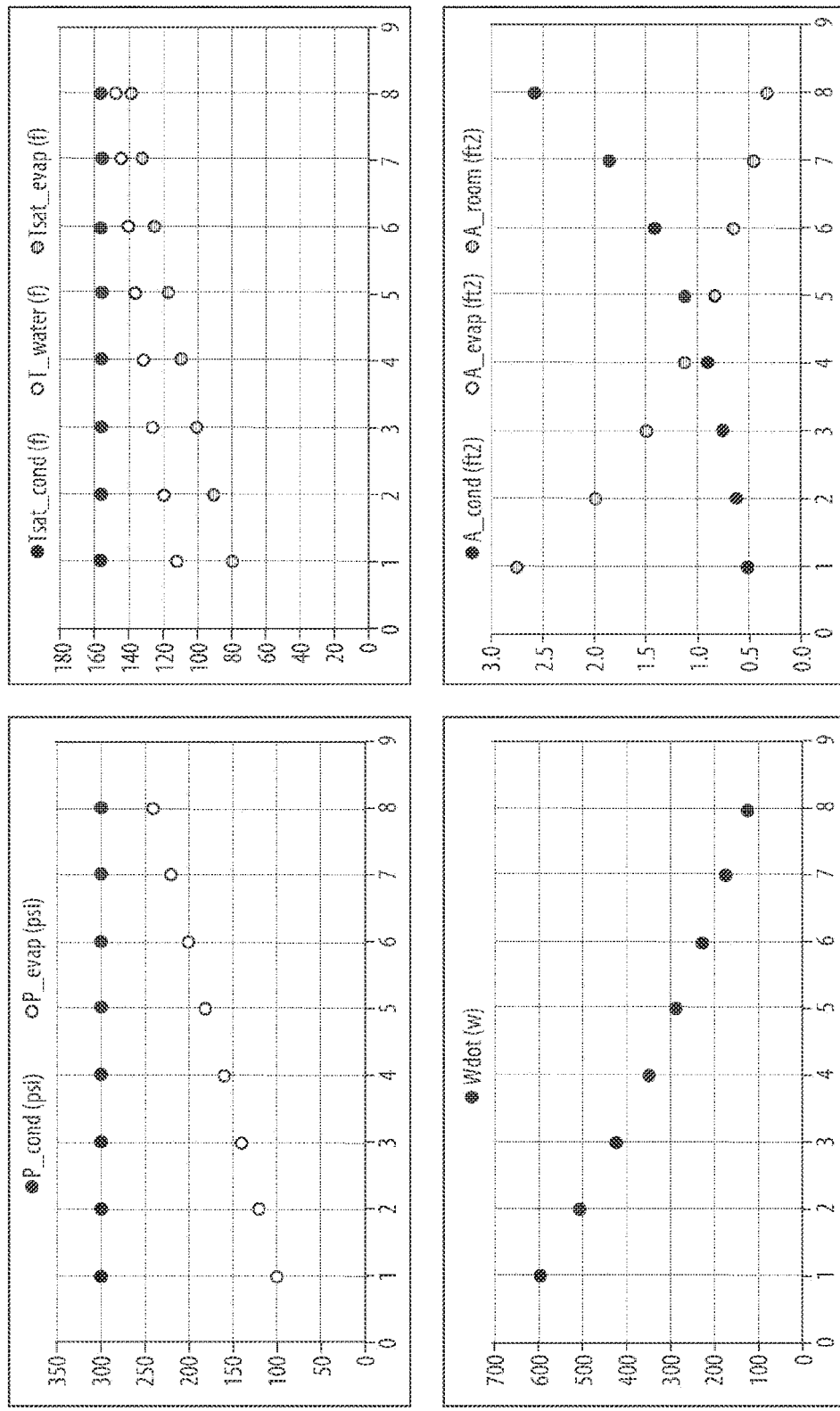
FIG. 14 illustrates performance simulations at different pressures.

The simulation was then run for various evaporator pressures. The results are shown in in FIG. 14. The x-axis is the index common to all runs. The variables plotted are pressures, temperatures, compressor power, and heat exchanger surface areas. The evaporator temperature tracks the evaporator pressure. The water temperature falls between the condenser and evaporator temperatures. The compressor power decreases as the evaporator pressure increases via the decreasing compressor pressure difference (or ratio). The evaporator and condenser areas are equal and increase as the evaporator pressure increases via the decreasing temperature difference between the refrigerant and the water. The area for heat rejection to the room tracks the compressor power. The surface areas are all roughly equal to 1 ft2 at an evaporator pressure of 170 psi.

The concept presented here absolutely minimizes risk within the heat pump. The performance related risk shifts to control of non-water species on the water side. The water side pressure is roughly 2.5 psi. The water to air boundary cannot leak. If air enters and mixes with the water vapor, then the water will not boil. Standard design practices exist for leak-free vacuum chambers. A seal condition con is that the chamber should be designed to be easily opened and cleaned by hand. A seal condition pro is that the temperature bounds are moderate, 110 to 160 F.

Purging the initial air in the water chambers and degassing dissolved gases are separate factors. The distillate flowrate will be sensitive to the amount of non-water vapor after venting. Trace air will reduce the nucleate boiling force on the evaporator side and will add a gas phase diffusion resistance to the condenser side. A follow up analytical study is recommended to quantify the affect.

Sources of model error include the overall heat transfer coefficients, no refrigerant superheat at the evaporator exit, no refrigerant sub-cooling at the condenser exit, and no air in the water chambers. A combination of analytical models and isolated tests can be used to minimize uncertainty. Ultimately a full prototype verification will be required ideally with extensive instrumentation.

The evaporator side heat transfer is via nucleate boiling. The coil should therefore be submerged at all times. This dictates a horizontal layout, either a spiral or linear pattern with relatively equal space between coils. The condenser side heat transfer is via falling film condensation. The coils should therefore be out of the condensed water at all times. This dictates a similar horizontal layout.

The evaporator side will require cleaning, ideally very simple disassembly and manual cleaning like a cooking pot. There will be residual water in the evaporator at the end of a run. It can be left in the evaporator for the next run, but salt buildup is an issue. The trade-offs here will be investigated. The condenser side will have clean water. In principle it does not require cleaning, but it the user should have the option to clean all the parts that touch the water.

The initial pre-heat venting phase should drive off all the volatiles, provided enough time has passed. There may be a trade-off between pre-heat time and volatile venting. Testing is required. If volatiles take a long time to vent, then a charcoal filter can be used like in small thermal distillers.

The condenser vent placement and the air/steam velocity field factor into the duration. If the vent is at the top of the condenser and the steam velocity is very low, the air will tend to remain at the bottom of the condenser because air is denser than steam.

Exiting small distillers use direct (single effect) thermal method, discussed in report [2], are 0.2-0.5 gph at 3000 W*hr/gal. Theoretically 350 W*hr is required to bring water from room temperature to boiling, and 2400 W is required for boiling. This gives a total of 2750 W*hr, and therefore 250 W*hr for venting and peripheral electronics. Here the performance specs of 1 gph at 320 W gives a specific energy consumption of 320 W*hr/gal. If the fan draws 30 W, then the operating energy is roughly 350 W*hr/gal. Adding the pre-heat gives a total energy consumption of 700 W*hr/gal.

To reduce the pre-heat, heat recovery can be used, such as a counterflow heat exchanger used in continuous systems. This does not fit with the simple batch method presented here.

The concept described here is the base "engine" for cleaning water. It can be used for a number of different applications. Considerations include: home, commercial, lab, industrial, distilling tap water, distilling waste water, distilled water as output, distilled water with additives for drinking or coffee or plants or animals. A market study is recommended to guide strategy.

The foregoing water distiller concept uses a refrigeration heat pump operating at low temperature by maintaining a vacuum in the water chambers. Purging the non-water species from the water chambers and maintaining a water/air seal is considered critical to performance. A math performance model was developed, and an initial optimization was performed. The results show 1 gph distillate, with 320 W compressor power, and roughly 1 ft2 heat exchanger surface areas.

The invention being thus disclosed and described, further examples, improvements and variations will occur to one skilled in the art, and these devices, operating steps and methods of efficiently and quickly producing a defined batch or flow of distilled water are encompassed by the invention and intended to be covered by the claims appended hereto.

The invention claimed is:

1. A water distillation system, comprising:
   a water evaporator configured to evaporate liquid water to generate water vapor;
   a water vapor compressor configured to receive and compress the water vapor from the water evaporator to generate compressed water vapor;
   a water condenser configured to receive and condense at least a first portion of the compressed water vapor from the water vapor compressor to generate distilled water, wherein the water condenser is in thermal communication with the water evaporator so that latent heat of vaporization of the compressed water vapor in the water condenser is transferred to the liquid water in the water evaporator; and
   a bubbler configured to produce bubbles in the liquid water in the water evaporator.

2. The water distillation system of claim 1, wherein the water evaporator and the water condenser share a common wall through which the latent heat of vaporization of the compressed water vapor in the water condenser can be transferred to the liquid water in the water evaporator.

3. The water distillation system of claim 1, further comprising:
   a refrigerant evaporator configured to evaporate liquid refrigerant to generate refrigerant vapor;
   a refrigerant vapor compressor configured to receive and compress the refrigerant vapor from the refrigerant evaporator to generate compressed refrigerant vapor;
   a refrigerant condenser configured to receive and condense the compressed refrigerant vapor from the refrigerant vapor compressor to generate the liquid refrigerant; and
   a throttle valve configured to feed the liquid refrigerant back to the refrigerant evaporator;
   wherein the water condenser is in thermal communication with the refrigerant evaporator so that the latent heat of vaporization of the compressed water vapor in the water condenser is transferred to the liquid refrigerant in the refrigerant evaporator; and
   wherein the water evaporator is in thermal communication with the refrigerant condenser so that latent heat of vaporization of the compressed refrigerant vapor in the refrigerant condenser is transferred to the liquid water in the water evaporator.

4. The water distillation system of claim 1, wherein the bubbler is configured and arranged to receive a second portion of the compressed water vapor from the water vapor compressor and to use the second portion of the compressed water vapor to produce the bubbles.

5. The water distillation system of claim 4, further comprising:
   a heater configured to heat the liquid water in the water evaporator to generate a portion of the water vapor; and
   a vent configured to vent the portion of the water vapor from the water evaporator to establish and maintain a reduced pressure within the water evaporator.

6. The water distillation system of claim 1, further comprising:
   a heater configured to heat the liquid water in the water evaporator to generate a portion of the water vapor; and
   a vent configured to vent the portion of the water vapor from the water evaporator to establish and maintain a reduced pressure within the water evaporator.

7. A method for distilling water, comprising:
   introducing bubbles into liquid water in a water evaporator while the water evaporator is evaporating the liquid water to generate water vapor;
   compressing the water vapor from the water evaporator to generate compressed water vapor;
   feeding at least a first portion of the compressed water vapor to a water condenser;
   condensing the first portion of the compressed water vapor in a water condenser to generate distilled water; and transferring latent heat of vaporization of the compressed water vapor in the water condenser to the liquid water in the water evaporator.

8. The method of claim 7, wherein transferring the latent heat further comprises:
    transferring the latent heat through a common wall between the water evaporator and the water condenser, with the liquid water in the water evaporator contacting a first side of the common wall and the compressed water vapor in the water condenser contacting a second side of the common wall.

9. The method of claim 7, wherein transferring the latent heat further comprises:
    evaporating liquid refrigerant with a refrigerant evaporator to generate refrigerant vapor;
    compressing the refrigerant vapor to generate compressed refrigerant vapor;
    condensing the compressed refrigerant vapor with a refrigerant condenser to generate the liquid refrigerant;
    feeding the liquid refrigerant back to the refrigerant evaporator;
    transferring the latent heat of vaporization of the compressed water vapor in the water condenser to the liquid refrigerant in the refrigerant evaporator; and
    transferring latent heat of vaporization of the compressed refrigerant vapor in the refrigerant condenser to the liquid water in the water evaporator.

10. The method of claim 7, further comprising:
    introducing a second portion of the compressed water vapor into the liquid water in the water evaporator to produce the bubbles.

11. The method of claim 10, further comprising:
    heating the liquid water in the water evaporator to generate a portion of the water vapor; and
    venting the portion of the water vapor from the water evaporator to establish and maintain a reduced pressure within the water evaporator.

12. The method of claim 7, further comprising:
    heating the liquid water in the water evaporator to generate a portion of the water vapor; and
    venting the portion of the water vapor from the water evaporator to establish and maintain a reduced pressure within the water evaporator.

13. A water distillation system, comprising:
    a water evaporator configured to evaporate liquid water to generate water vapor;
    a water vapor compressor configured to receive and compress the water vapor from the water evaporator to generate compressed water vapor;
    a water condenser configured to receive and condense the compressed water vapor from the water vapor compressor to generate distilled water;
    means for transferring latent heat of vaporization of the compressed water vapor in the water condenser to the liquid water in the water evaporator; and
    means for introducing bubbles into the liquid water in the water evaporator while the water evaporator is evaporating the liquid water to generate the water vapor.

14. The water distillation system of claim 13, wherein the means for transferring latent heat comprises a common wall that is shared by the water evaporator and the water condenser and through which the latent heat of vaporization of the compressed water vapor in the water condenser can be transferred to the liquid water in the water evaporator.

15. The water distillation system of claim 13, wherein the means for transferring latent heat comprises:
    a refrigerant evaporator configured to evaporate liquid refrigerant to generate refrigerant vapor;
    a refrigerant vapor compressor configured to receive and compress the refrigerant vapor from the refrigerant evaporator to generate compressed refrigerant vapor;
    a refrigerant condenser configured to receive and condense the compressed refrigerant vapor from the refrigerant vapor compressor to generate the liquid refrigerant; and
    a throttle valve configured to feed the liquid refrigerant back to the refrigerant evaporator;
    wherein the water condenser is in thermal communication with the refrigerant evaporator so that the latent heat of vaporization of the compressed water vapor in the water condenser is transferred to the liquid refrigerant in the refrigerant evaporator; and
    wherein the water evaporator is in thermal communication with the refrigerant condenser so that latent heat of vaporization of the compressed refrigerant vapor in the refrigerant condenser is transferred to the liquid water in the water evaporator.

16. The water distillation system of claim 13, wherein the means for introducing bubbles into the liquid water comprise a bubbler that is configured and arranged to receive a second portion of the compressed water vapor from the water vapor compressor and to use the second portion of the compressed water vapor to produce the bubbles.

17. The water distillation system of claim 16, further comprising:
    a heater configured to heat the liquid water in the water evaporator to generate a portion of the water vapor; and
    a vent configured to vent the portion of the water vapor from the water evaporator to establish and maintain a reduced pressure within the water evaporator.

18. The water distillation system of claim 13, further comprising:
    a heater configured to heat the liquid water in the water evaporator to generate a portion of the water vapor; and
    a vent configured to vent the portion of the water vapor from the water evaporator to establish and maintain a reduced pressure within the water evaporator.

* * * * *